United States Patent [19]
Caray

[11] Patent Number: 4,516,672
[45] Date of Patent: May 14, 1985

[54] PROGRESSIVE ENGAGEMENT FRICTION DISC

[75] Inventor: André Caray, Paris, France

[73] Assignee: Valeo, Paris, France

[21] Appl. No.: 404,922

[22] Filed: Aug. 3, 1982

[30] Foreign Application Priority Data

Aug. 20, 1981 [FR] France ................................ 81 16001

[51] Int. Cl.³ ........................ F16D 13/68; F16D 13/64
[52] U.S. Cl. .................................. 192/107 C; 192/52
[58] Field of Search ............................. 192/107 C, 52

[56] References Cited

U.S. PATENT DOCUMENTS

| | | | |
|---|---|---|---|
| 1,837,173 | 12/1931 | Reed | 192/107 C |
| 2,101,411 | 12/1937 | Nutt et al. | 192/107 C |
| 2,117,527 | 5/1938 | Wemp | 192/107 C |
| 2,195,666 | 4/1940 | Wolfram | 192/107 C |
| 2,244,134 | 6/1941 | Thelander | |
| 2,502,653 | 4/1950 | Kelleher | 192/107 C |
| 2,520,350 | 8/1950 | Wemp | |
| 2,547,427 | 4/1951 | Zeidler | 192/107 C |
| 2,566,394 | 9/1951 | Zeidler | 192/107 C |
| 2,589,508 | 3/1952 | Nutt et al. | 192/107 C |
| 2,597,911 | 5/1952 | Thelander | 192/107 C |
| 2,618,369 | 11/1952 | Zeidler | 192/107 C |
| 2,627,332 | 2/1953 | Goodwin | 192/107 C |
| 3,261,439 | 7/1966 | Binder | 192/107 C |
| 3,921,777 | 11/1975 | Rist | 192/107 C |
| 4,022,310 | 5/1977 | de Gennes | 192/107 C |

FOREIGN PATENT DOCUMENTS

| | | |
|---|---|---|
| 2751043 | 5/1978 | Fed. Rep. of Germany ... 192/107 C |
| 824479 | 2/1938 | France . |
| 988326 | 8/1951 | France . |
| 1304067 | 5/1963 | France . |
| 2168833 | 8/1973 | France . |
| 2210245 | 7/1974 | France . |
| 2291416 | 6/1976 | France . |
| 2352211 | 2/1977 | France . |
| 2370893 | 6/1978 | France . |

Primary Examiner—Rodney H. Bonck
Attorney, Agent, or Firm—Young & Thompson

[57] ABSTRACT

A progressive engagement friction disc, particularly for a clutch, comprises a hub, an annular washer coupled to the hub, and a circular series of blades fixed to the hub carrying friction linings on both surfaces. The blades comprise plane areas extending at two slightly different levels connected by ramps. One of the ramps is divided in the direction of its level lines into at least two parts which are inclined in the same direction and which are offset relative to one another in a transverse direction relative to their extension, thus making it possible to increase the useful surface of the area to which the corresponding lining is riveted.

23 Claims, 11 Drawing Figures

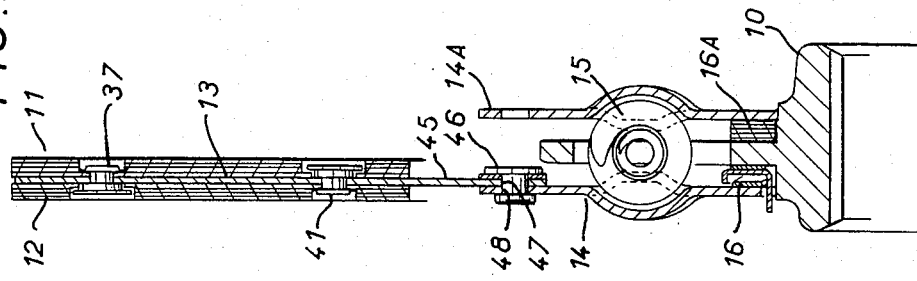
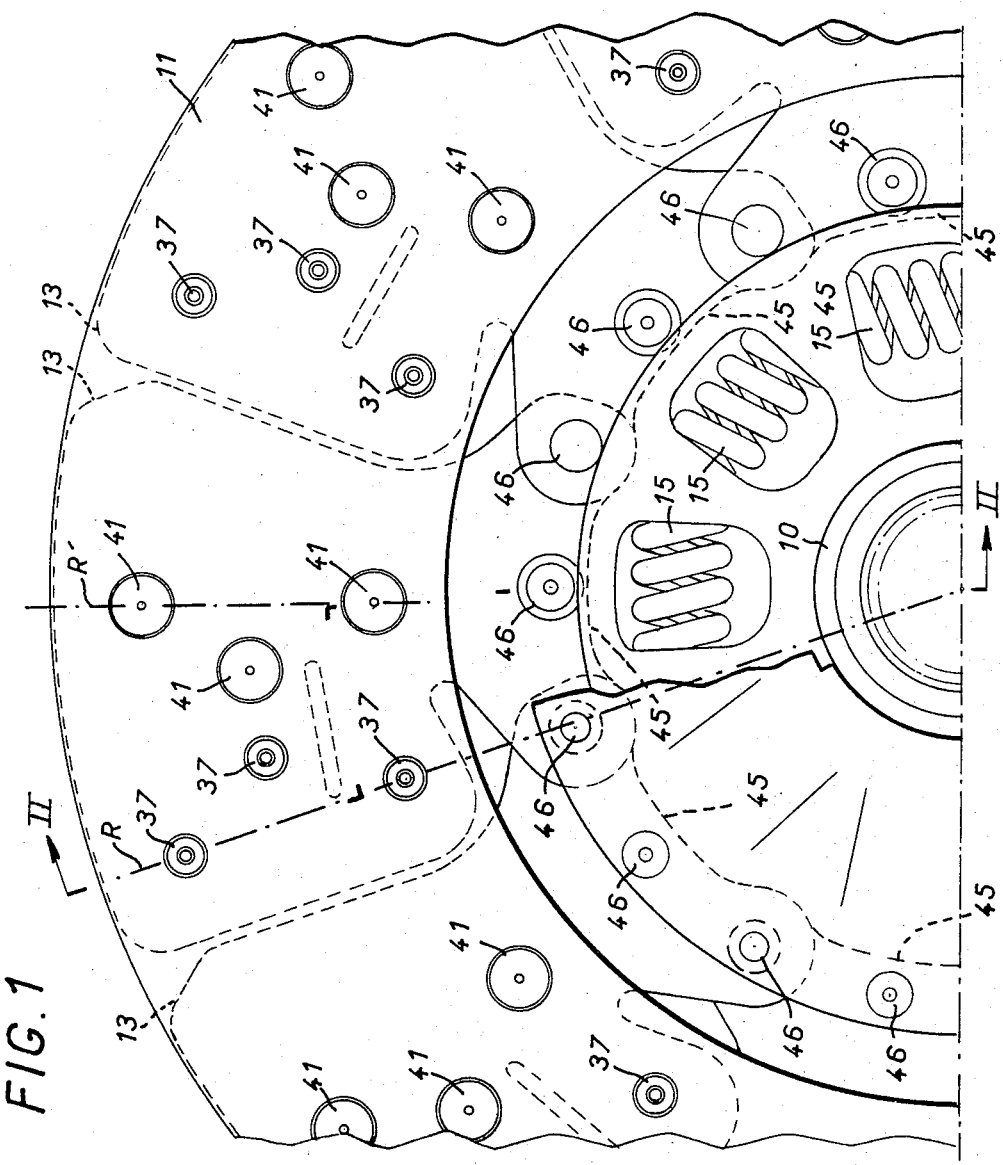

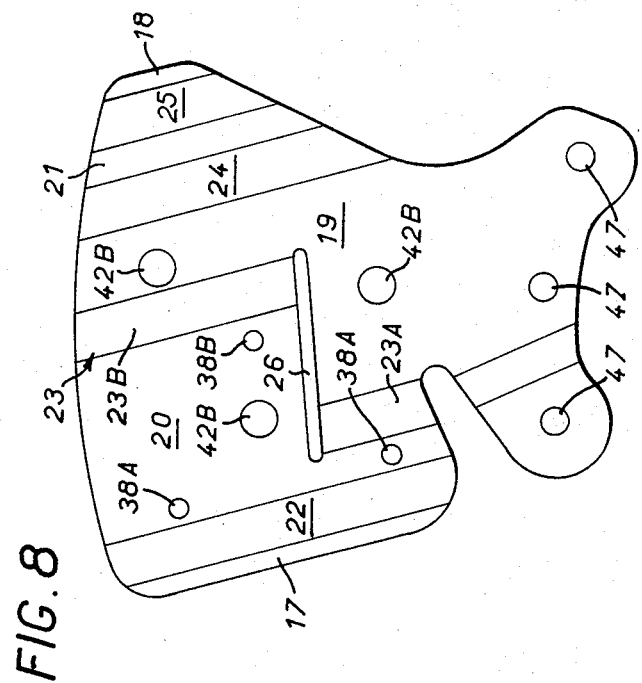

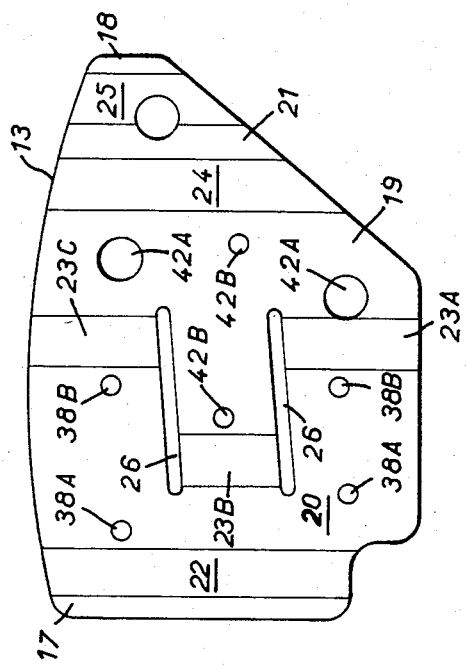
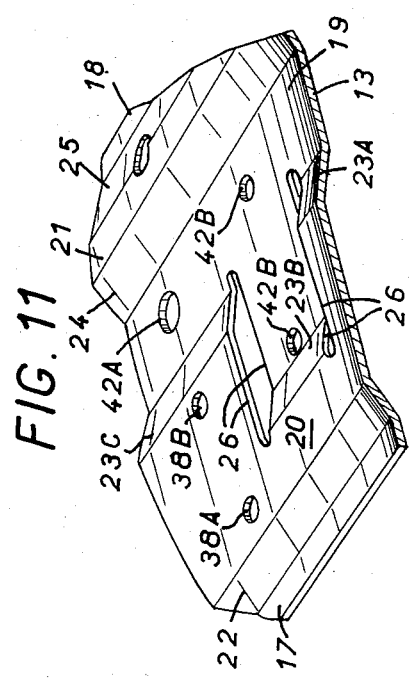
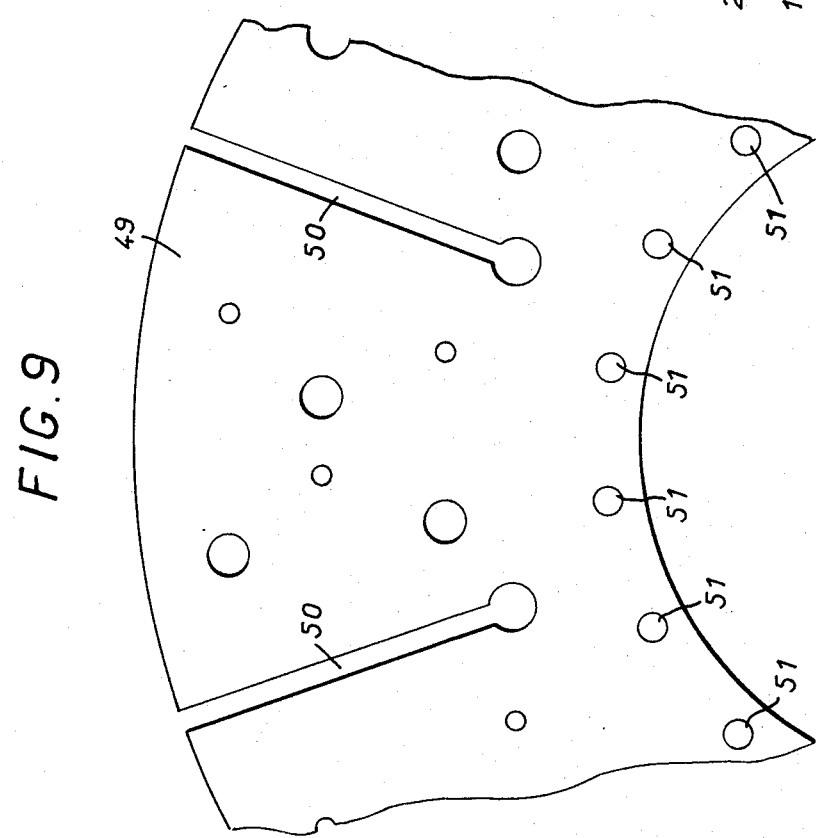

PROGRESSIVE ENGAGEMENT FRICTION DISC

BACKGROUND OF THE INVENTION

The present invention relates to a progressive engagement friction disc, particularly for use as a driven plate in a clutch, comprising a hub and at least two friction linings fixed on both sides of blades disposed in a circular series and fastened to at least one annular washer coupled to the hub, each blade having plane areas distributed in at least two sets which adjoin the two respective friction linings, the latter being fixed thereto, and which extend at slightly different levels in two parallel planes, and ramp means connecting the plane areas of one of the sets to the plate areas of the other set.

The blades may be composed of small individual parts which are easy to manufacture without loss of material, and are fixed to the washer by any suitable means. However, they may also all form together an integral annular whole, which is either separate from the washer and attached thereto by any suitable means or is itself integral with this washer.

The washer is generally coupled to the hub either by direct fastening, or with the aid of a device permitting limited torsion under the control of resilient means, with a frictional damping effect.

The plane areas of the blades are situated in parallel planes on at least two slightly different levels and, through the resilient axial compression of the blades, permit progressive engagement when the disc is gripped at its friction linings inside the clutch.

It will be appreciated that during this axial compression of the disc, the areas of one of the levels, which will be called fixed areas, are allowed to retain the same axial position relative to the washer, and the areas of the other level, which will be called movable areas, are allowed to move axially closer to the fixed areas in the course of the flattening of the blade.

The use of compressible blades is advantageous for obtaining a progressive action not only at the time when engagement is effected, in order to avoid jerkiness, but is also useful while the clutch remains in the engaged state, because it makes it possible to compensate for manufacturing and assembly tolerances of the various parts of the clutch, as well as for deformation due to heat which may occur in the course of operation.

The ramps connect together the plane areas lying at different levels, thus giving the blade satisfactory strength and at the same time excellent resilient compressibility.

In general, the plane areas, or at least some of them, are narrow in a circumferential direction, so that it is difficult to fasten the linings to them, for example by riveting and/or adhesive bonding. In order to strengthen the riveting, it is of course possible to contemplate increasing the number of rivets by placing more of them on the same radial line, having regard to the circumferential narrowness of the area, but, if this is done, there is danger that a line of reduced strength will be formed in the blade and the linings.

The object of the present invention is a progressive engagement friction disc of the kind described above, particularly for a clutch, in which the conditions of the fastening of the linings to the blades, particularly by rivets, are substantially improved, while at the same time the construction is convenient and strong, and operation is excellent.

SUMMARY

According to the invention, a friction disc of the kind described is characterised in that at least one of the ramp means is divided, in the direction of its level lines, into at least two parts inclined in the same direction and offset relative to one another in a transverse direction relative to the said level lines.

Because of this offsetting, a gain of surface is made, particularly circumferentially, on at least one area which is axially movable relative to the washer, thus making it possible to distribute in a convenient manner the fastening rivets on this movable area while increasing the number thereof, without having to align them all on the same radial line. Excellent triangulation is thus achieved in the riveting and the fastening is thus given great strength. When adhesive bonding is used, this too is improved because of the gain in surface. Where applicable, however, the reinforcement of the riveting may make it possible to dispense with additional fastening by adhesive bonding, thus simplifying manufacture.

According to another feature, the offset parts of the ramp means are separated from one another by a closed slot lying transversely to the level lines of the said ramp means. A slot of this kind makes it possible for the blade to be conveniently manufactured with the parts of the ramp offset relative to one another. In view of the fact that the slot is closed, it does not weaken the resistance of the blade to the action of centrifugal force and it enables a constant distance to be maintained for the rivet holes lying on each side of this slot.

According to another feature, the plane areas of the two sets define, in conjunction with the ramp means, edges which are all parallel to one another. This parallelism permits convenient manufacture.

Preferably, the edges are parallel to a radial line along which are aligned two of the rivets which fasten a lining to an adjoining plane area which is axially movable relative to the washer. In this way, the lining is acted on tangentially by displacement forces at this fastening point. Any tendency for the lining to be deformed radially in one direction or the other is thus avoided.

In one embodiment, each blade has a foot part which is fixed directly to the washer.

As an alternative, at least one plane reinforcement ring fixed to the washer is interposed between the blades and at least one of the friction linings. The blade may have a foot part which is fixed to the washer at the same time as the plane reinforcement ring, or else it may have no foot, in which case it is fixed to the washer only by means of the plane reinforcement ring. In the latter case, the thickness of the blade may be selected at will solely in dependence on the optimum conditions of progressiveness because the strength of the assembly is ensured by the plane reinforcement ring, which is suitably selected for the purpose.

Preferably, each friction lining is fixed to an adjoining plane area by rivets each of which have a shoulder which cooperates as a stop with a bearing surface associated with the other friction lining, in order to limit the axial distance between the two friction linings.

BRIEF DESCRIPTION OF THE DRAWINGS

FIG. 1 is a partial half-view in elevation of a friction disc according to the invention;

FIG. 2 is a corresponding half-view, in section along the broken line II—II in FIG. 1;

FIG. 6 is a view similar to FIG. 3, but relates to an alternative blade adapted to be associated with a plane reinforcement ring;

FIG. 7 shows on a large scale, and in section, the method of fastening the linings to the blade shown in FIG. 6;

FIG. 8 is a view similar to FIG. 6, but relates to another alternative form of blade;

FIG. 9 shows in elevation part of the plane reinforcement ring which is associated with the blades shown in FIG. 8;

FIG. 10 is a similar view to FIG. 8, but relates to yet another alternative form of blade;

FIG. 11 shows in perspective part of the blade shown in FIG. 10.

DETAILED DESCRIPTION OF THE PREFERRED EMBODIMENTS

Figure 4:
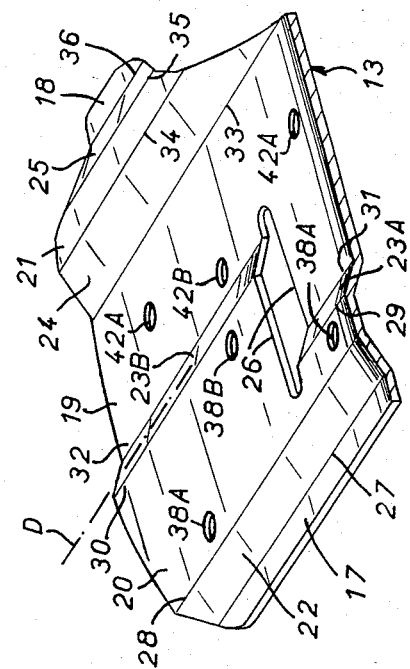
FIG. 4 is a partial view in perspective of this blade.

Reference will first be made to FIGS. 1 to 5 which relate, by way of non-limitative example, to the application of the invention to a progressive engagement friction disc, particularly for use as a driven plate in a clutch of an automobile vehicle, for example a heavy goods vehicle.

This friction disc (FIGS. 1 and 2) comprises a hub 10 and two friction linings 11 and 12 fixed one on each side of blades 13. The blades 13 are disposed in a circular series, and in the example shown are individual and are fastened by rivets 46 to at least one supporting washer 14.

The supporting washer 14 is coupled to the hub 10 in any suitable manner, for example (FIGS. 1 and 2) by a device which permits limited torsion relative to the hub under the control of resilient means 15, which in this case are springs. In FIG. 2, the washer 14 is duplicated by another washer 14A in order to provide good seating for the springs 15. The limited torsion is controlled by these springs 15, with a damping action from a friction washer 16A interposed between the hub 10 and the washer 14A and adjusted by a resilient washer 16 interposed between the hub 10 and the washer 14.

The washer 14 could be fixed directly to the hub 10, and in this case the springs 15 and the various washers 14A, 16 and 16A are not used.

Figure 3:
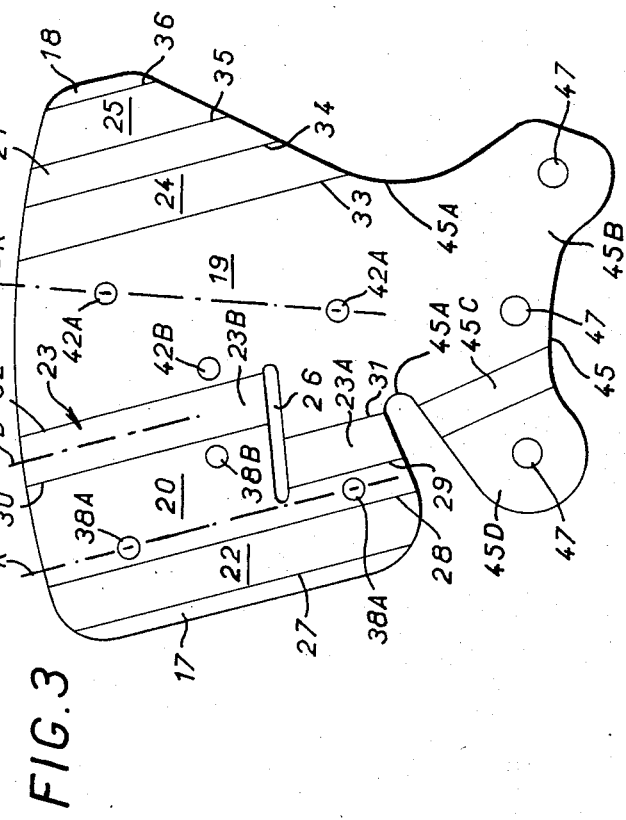
FIG. 3 is a view in elevation of one of the blades of the disc shown in FIGS. 1 and 2.
Figure 5:
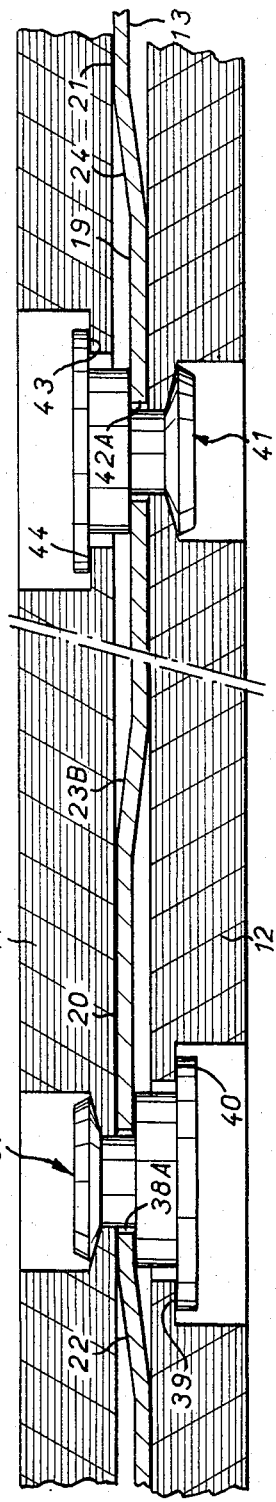
FIG. 5 shows on a large scale, and in section, the method of fastening the linings to this blade.

Each blade 13 (FIGS. 3 to 5) has plane areas distributed in at least two sets, which adjoin the two friction linings 11 and 12 respectively, the latter being fixed thereto, and which extend at slightly different levels in two parallel planes (FIGS. 3 and 5).

In the example shown in these FIGS. 3 and 5, one of the sets of areas comprises two end areas 17 and 18 and an intermediate area 19. The other set of areas comprises an area 20 lying between the areas 17 and 19, and an area 21 lying between the areas 18 and 19. A ramp 22 connects the areas 17 and 20. A ramp 23 connects the areas 19 and 20. A ramp 24 connects the areas 19 and 21, and a ramp 25 connects the areas 18 and 21.

The areas 17, 18, 19 and the areas 20, 21, situated at two slightly different levels, permit progressive engagement, through resilient axial compression of the disc, when the disc is gripped at its friction linings 11, 12, inside the clutch.

When this axial compression of the disc takes place, the areas 17, 18, 19 remain fixed, being allowed to retain the same axial position relative to the washer 14, while the areas 20, 21 are movable and are allowed to move axially closer to the fixed areas 17, 18, 19 in the course of the flattening of the blade 13. This is due to the fact that the area 19 forms an integral unit with the washer 14 through the fastening rivets 46.

The ramp 23 is divided in the direction D of its level lines into two parts 23A and 23B, which are inclined in the same direction and are offset relative to one another in a transverse direction relative to the level lines in the direction D, thus making it possible to increase the useful surface of the area 20 for the fastening of the lining 11 by riveting and/or adhesive bonding.

The parts 23A and 23B are separated from one another by a closed slot 26 lying transversely to the direction D.

The area 17 defines, together with the ramp 22, an edge 27. The ramp 22 defines, together with the area 20, an edge 28. The ramp 23A defines, together with the area 20, an edge 29. The ramp 23B defines, together with the area 20, an edge 30. The ramp 23A defines, together with the area 19, an edge 31. The ramp 23B defines, together with the area 19, an edge 32. The area 19 defines, together with the ramp 24, an edge 33. The ramp 24 defines, together with the area 21, an edge 34. The area 21 defines, together with the ramp 25, an edge 35, and the ramp 25 defines, together with the area 18, an edge 36.

The lining 11 is fixed to the area 20 adjoining it by rivets 37, which pass through holes 38A and 38B provided in the area 20. At most two of these holes 38A are aligned on the same radial line R of the axially movable area 20 (FIGS. 1 and 3). Another rivet hole 38B is offset (FIG. 3) relative to this radial line R. Triangulation of this kind in the arrangement of the fastening rivets 37 is possible because of the offsetting of the two parts 23A and 23B of the ramp 23, which enables the circumferential width of the area 20 to be increased.

The various edges previously defined (27, 28, 29, 30, 31, 32, 33, 34, 35 and 36) are all parallel to the radial line R on which the rivet holes 38A are disposed. As can be seen in FIG. 5, each rivet 37 has a shoulder 39 which cooperates, as a stop, with a bearing surface 40 associated with the lining 12, in order to limit the axial distance between the linings 11 and 12. In the example shown in FIG. 5, the bearing surface 40 is formed by the lining 12 itself.

The lining 12 is fixed by rivets 41 to the area 19, in which holes 42A and 42B are provided for this purpose. As can be seen in FIG. 3, two holes 42A are aligned along a radial line R', while another hole 42B is offset relative to this radial line R'. Each rivet 41 has a shoulder 43 which cooperates, as a stop, with a bearing surface 44 associated with the lining 11 in order to limit the axial distance between the linings 11 and 12, thus reinforcing the stop action of the shoulders 39 against the bearing surfaces 40.

In the example shown in FIGS. 1 to 5, each blade 13 has a foot 45 fixed to the washer 14 by three rivets 46 passing through holes 47 in the feet 45 and holes 48 in the washer 14. Each end rivet 46 is common to the foot 45 of the blade 13 and to the foot of the adjoining blade, which partly overlaps this foot 45 of the blade 13.

Thus, the various blades 13 are fixed directly by their feet 45 to the washer 14.

It will be observed, particularly in FIG. 3, that the blade 13 is connected to its foot 45 by a plane narrowed neck 45A which forms part of the fixed area 19 and also which has no folds, thus permitting excellent mechanical durability. From FIG. 3 it will also be appreciated that the foot 45 has a portion 45B coplanar with the area 19 and the narrowed neck 45A and having two holes 47, a ramp 45C, and a portion 45D which is raised relative to the portion 45B in order to permit the overlapping of the adjoining foot and which is provided with a hole 47.

Reference will now be made to FIGS. 6 and 7, in which the arrangement is similar to that just described with reference to FIGS. 1 to 5, but in which at least one plane reinforcement ring 49 is inserted between the blades 13 and at least one of the friction linings, for example the lining 12.

The plane reinforcement ring 49 is provided with radial slots 50, as shown in FIG. 9.

The plane reinforcement ring 49 (FIGS. 6 and 7) is adjacent to the areas 17, 18, 19 and is fixed to the area 19 by the rivets 41. This reinforcement ring 49 is fixed to the washer 14 by the rivets 46 which serve to fix the feet 45 of the blades 13 to this washer 14, and for this purpose (FIG. 9) is provided with holes 51 in alignment with the holes 47.

Thus, each blade 13 has a foot 45 which is fixed to the washer 14 at the same time as the plane reinforcement ring 49.

It will be seen in FIG. 7 that the bearing surface 40 with which the shoulder 39 of the rivet 37 cooperates as a stop is here formed by the reinforcement ring 49. As an alternative, the bearing surface 40 could be formed by the lining itself, as in FIG. 5.

In the alternative embodiment shown in FIGS. 8 and 9, the arrangement is similar to that described with reference to FIGS. 6 and 7, but the ramp part 23B is here further offset relative to the ramp part 23A than in the case of FIG. 6, so that one of the holes 42B is situated in the area 20.

In FIG. 8, only the rivets of the area 20 are shouldered in order to limit the axial distance between the linings, while the rivets of the area 19 are not provided with shoulders. A simplified arrangement of this kind is permitted by the relatively great width of the area 20.

In another alternative embodiment (FIGS. 10 and 11), the arrangement is still similar to those described previously, but the ramp 23 is here divided into three consecutive parts 23A, 23B and 23C separated by two slots, such as the slots 26. The central part 23B is offset relative to the end parts 23A and 23C, which are in alignment.

The area 20 is here provided with four rivet holes: the holes 38A similar to those shown in FIG. 6 and two holes 38B, thus permitting increased strength of fastening.

In FIGS. 10 and 11 the blade 13 has no foot and is fixed to the washer 14 solely by means of the plane reinforcement ring 49.

It will be appreciated that the friction discs in accordance with the various embodiments which have been described above are of robust construction and provide excellent progressiveness. The fastening of the linings to the blades by riveting and/or adhesive bonding is reinforced because of the gain in circumferential width due to the offsetting of the ramp parts such as 23A, 23B, 23C. The reinforced riveting may possibly enable additional fastening by adhesive bonding to be eliminated. It will be noted that the closed slots 26 facilitate the manufacture of the blades without imparing their resistance to the effects of centrifugal force, and that the parallelism of the various edges 27 to 37 to the radial line R also facilitates manufacture and improves the durability of the linings 11 and 12.

It will be appreciated that in the various embodiments described and illustrated each transverse slot 26 is substantially rectilinear and short and ensures cutting out without any part being parallel to the edges such as 27, thus permitting excellent strength.

The invention is not limited to the embodiments described and illustrated, but includes all alternative embodiments within the framework of the claims.

I claim:

1. A progressive engagement friction disc comprising a hub, at least one washer coupled to said hub, at least two friction linings fixed one on each side of blades disposed in a circular series and fastened to said at least one washer, each of said blades having plane areas divided into at least two sets for fixing the respective friction linings thereto, said plane areas extending at slightly different levels in two parallel planes, and ramp means connecting the plane areas of one of the sets to the plane areas of the other set through bend lines at the levels of the respective plane areas, at least one of the ramp means comprising at least two radially extending parts offset from each other in a circumferential direction, and said offset parts of the said ramp means being separated from each other by a closed circumferentially extending slot disposed transversely to said at least one ramp means.

2. A friction disc according to claim 1, wherein said bend lines are all parallel to one another.

3. A friction disc according to claim 1, wherein each of said friction linings is fixed to its associated plane areas by rivets, at most two rivets for a said associated plane area being aligned in radial alignment.

4. A friction disc according to claim 1, wherein at least one of the linings is fixed to its associated plane area by rivets of which two are aligned along a radial line, and the plane areas of the two sets join the ramp means at associated bend lines which are all parallel to the said radial line.

5. A friction disc according to claim 3, wherein one of said plane areas is adapted to be axially movable relative to the washer during progressive engagement of the friction disc.

6. A friction disc according to claim 1, wherein each blade is provided with a foot part which is directly fixed to the washer.

7. A friction disc according to claim 1, wherein at least one plane reinforcement ring is interposed between the blades and at least one of the friction linings.

8. A friction disc according to claim 7, wherein said plane reinforcement ring is provided with at least one slit.

9. A friction disc according to claim 7, wherein said plane reinforcement ring is adjacent to one of the sets of plane areas to which it is fixed.

10. A friction disc according to claim 7, wherein said plane reinforcement ring is fixed to said washer.

11. A friction disc according to claim 10, wherein each blade has a foot part which is fixed to the washer and to said plane reinforcement ring.

12. A friction disc according to claim 10, wherein each of said blades is footless and fixed to the washer solely by means of said plane reinforcement ring.

13. A friction disc according to claim 1, wherein said ramp means is divided into only two offset circumferential parts.

14. A friction disc according to claim 1, wherein said ramp means is divided into at least three consecutive parts of which a central part is offset relative to two circumferentially aligned end parts.

15. A friction disc according to claim 1, wherein each of said friction linings is fixed to its associated plane areas by rivets, and said rivets have a shoulder which abuts a bearing surface associated with the other of said friction linings so as to limit the axial distance between the two friction linings.

16. A friction disc according to claim 1, wherein said slot defines an end of each of said parts of said one ramp means.

17. A friction disc according to claim 1, wherein the slot defines the radially inner end of one of the parts of said one ramp means and the radially outer end of another of said parts of said one ramp means.

18. A friction disc according to claim 1, wherein portions of said planar areas overlap circumferentially on opposite sides of said slot.

19. A friction disc according to claim 1, wherein said closed slot consists of a chordal slot.

20. A friction disc according to claim 1, wherein at least one of said plane areas adjoining said one ramp means has three holes for securing its associated friction lining by means of three rivets, the holes being in a triangular array.

21. A friction disc according to claim 1, wherein both of plane areas adjoining said one ramp means have three holes for securing their associated friction lining by means of three rivets, the holes of each of said plane area being in a triangular array.

22. A friction disc according to claim 20, wherein two of said three holes in said one plane area are radially aligned.

23. A friction disc according to claim 21, wherein two of said three holes of each of said both plane areas are radially aligned.

* * * * *